(12) United States Patent
Farris et al.

(10) Patent No.: US 10,472,981 B2
(45) Date of Patent: Nov. 12, 2019

(54) EDGE TREATMENT FOR GAS TURBINE ENGINE COMPONENT (71) Applicant: United Technologies Corporation, Hartford, CT (US)

(72) Inventors: John R. Farris, Bolton, CT (US); Christopher W. Strock, Kennebunk, ME (US); Paul M. Lutjen, Kennebunkport, ME (US)

(73) Assignee: United Technologies Corporation, Farmington, CT (US)

( * ) Notice: Subject to any disclaimer, the term of this patent is extended or adjusted under 35 U.S.C. 154(b) by 883 days.

(21) Appl. No.: 14/769,834

(22) PCT Filed: Jan. 30, 2014

(86) PCT No.: PCT/US2014/013792
§ 371 (c)(1),
(2) Date: Aug. 24, 2015

(87) PCT Pub. No.: WO2014/133706
PCT Pub. Date: Sep. 4, 2014

(65) Prior Publication Data
US 2016/0003087 A1 Jan. 7, 2016

Related U.S. Application Data (60) Provisional application No. 61/769,245, filed on Feb. 26, 2013.

(51) Int. Cl.
F01D 11/24 (2006.01)
F01D 5/14 (2006.01)
F01D 9/02 (2006.01)

(52) U.S. Cl.
CPC ............... F01D 11/24 (2013.01); F01D 5/14 (2013.01); F01D 9/023 (2013.01);
(Continued)

(58) Field of Classification Search
CPC . F01D 11/24; F01D 5/14; F01D 9/023; F01D 5/288; F01D 9/04; F05D 2240/11;
(Continued)

(56) References Cited

U.S. PATENT DOCUMENTS 5,374,161 A   12/1994  Kelch et al.
6,899,518 B2   5/2005  Lucas et al.
(Continued)

FOREIGN PATENT DOCUMENTS

DE   19619438   11/1997
EP   1746253    1/2007
(Continued)

OTHER PUBLICATIONS

Engish Translation of DE19619438A1 translated on Jan. 6, 2019.*
(Continued)

Primary Examiner — Mark A Laurenzi
Assistant Examiner — Paul W Thiede
(74) Attorney, Agent, or Firm — Carlson, Gaskey & Olds, P.C.

(57) ABSTRACT

A gas turbine engine component according to an exemplary aspect of the present disclosure includes, among other things, a body having a first outer face meeting a second outer face at an intersection, the body having a plurality of apertures extending from an opening in the first outer face to an opening on the second outer face; and a coating filling at least a portion of the plurality of apertures.

19 Claims, 5 Drawing Sheets (52) U.S. Cl.
CPC ...... *F05D 2240/11* (2013.01); *F05D 2250/00* (2013.01); *F05D 2250/182* (2013.01); *F05D 2250/294* (2013.01); *Y02T 50/6765* (2018.05)

(58) Field of Classification Search
CPC ........... F05D 2250/00; F05D 2250/182; F05D 2250/294; C23C 4/18
USPC .............................................. 415/118, 173.1
See application file for complete search history.

(56) References Cited

U.S. PATENT DOCUMENTS

| | | | |
|---|---|---|---|
| 7,033,138 B2 | 4/2006 | Tomita et al. | |
| 7,306,424 B2 | 12/2007 | Romanov et al. | |
| 8,123,466 B2 | 2/2012 | Pietraszkiewicz et al. | |
| 8,287,234 B1 | 10/2012 | Liang | |
| 2001/0005555 A1 | 6/2001 | Kreis et al. | |
| 2006/0056960 A1* | 3/2006 | Sabol | C23C 4/18 415/118 |
| 2009/0067994 A1 | 3/2009 | Pietraszkiewicz et al. | |
| 2009/0155054 A1 | 6/2009 | Rathmann | |
| 2009/0169368 A1* | 7/2009 | Schlichting | F01D 11/122 415/173.1 |
| 2013/0017005 A1 | 1/2013 | Joe et al. | |
| 2013/0017058 A1* | 1/2013 | Joe | F01D 11/08 415/1 |

FOREIGN PATENT DOCUMENTS

| | | |
|---|---|---|
| EP | 1927725 | 6/2008 |
| EP | 2299061 | 3/2011 |
| EP | 2505781 | 10/2012 |
| GB | 2125111 | 2/1984 |

OTHER PUBLICATIONS

Supplementary Partial European Search Report for Application No. 14756958.6 dated Aug. 3, 2016.
International Preliminary Report on Patentability for PCT Application No. PCT/US2014/013792, dated Sep. 11, 2015.
International Search Report and Written Opinion for Application No. PCT/US2014/013792 dated May 7, 2014.

* cited by examiner

EDGE TREATMENT FOR GAS TURBINE ENGINE COMPONENT

BACKGROUND

This disclosure relates to a gas turbine engine component that may be incorporated into a gas turbine engine. More particularly, the disclosure relates to a component having a coating.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

The compressor and turbine sections of a gas turbine engine typically include alternating rows of rotating blades and stationary vanes. The turbine blades rotate and extract energy from the hot combustion gases that are communicated through the gas turbine engine. The turbine vanes prepare the airflow for the next set of blades. The vanes extend from platforms that may be contoured to manipulate flow.

An outer casing of an engine static structure may include one or more blade outer air seals (BOAS) that provide an outer radial flow path boundary for the hot combustion gases. The BOAS are arranged circumferentially adjacent to each other and meet at matefaces. During operation, the BOAS may experience spallation. The spallation often initiates at the edges and mate faces. The edges of other gas turbine engine components may experience spallation and other types of degradation.

SUMMARY

A gas turbine engine component according to an exemplary aspect of the present disclosure includes, among other things, a body having a first outer face meeting a second outer face at an intersection, the body having a plurality of apertures extending from an opening in the first outer face to an opening on the second outer face; and a coating filling at least a portion of the plurality of apertures.

In a further non-limiting embodiment of the foregoing gas turbine engine component, the plurality of apertures extend across the intersection.

In a further non-limiting embodiment of either of the foregoing gas turbine engine components, the plurality of apertures comprises more than six apertures.

In a further non-limiting embodiment of any of the foregoing gas turbine engine components, at least one aperture of the plurality of apertures is completely filled with the coating.

In a further non-limiting embodiment of any of the foregoing gas turbine engine components, at least one aperture of the plurality of apertures is defined by a pair of opposing walls and a curved floor.

In a further non-limiting embodiment of any of the foregoing gas turbine engine components, at least one aperture of the plurality of apertures is defined by a pair of opposing walls and at least two planar floors.

In a further non-limiting embodiment of any of the foregoing gas turbine engine components, an axial distance between axially adjacent openings of the plurality of apertures is about the same as an axial width of each of the adjacent openings.

In a further non-limiting embodiment of any of the foregoing gas turbine engine components, the coating comprises Yttria-Stabilized Zirconia.

In a further non-limiting embodiment of any of the foregoing gas turbine engine components, the body comprises a seal body of a blade outer air seal segment, the first outer face comprises a first mate face of the seal body, and the second outer face comprises a radially inner face of the seal body, the radially inner face extending circumferentially between the first mate face and a second mate face and extending axially between a leading edge face and a trailing edge face.

In a further non-limiting embodiment of any of the foregoing gas turbine engine components, the plurality of apertures are first apertures, and the seal body includes a plurality of second apertures that extend from an opening in the second mate face to an opening in the radially inner face.

In a further non-limiting embodiment of any of the foregoing gas turbine engine components, a bleed air conduit extends to an opening in the first mate face.

In a further non-limiting embodiment of any of the foregoing gas turbine engine components, the first mate face is a leading mate face relative to the second mate face in a direction of blade travel.

In a further non-limiting embodiment of any of the foregoing gas turbine engine components, the opening in the first mate face intersects with the opening in the radially inner face.

In a further non-limiting embodiment of any of the foregoing gas turbine engine components, the opening in the radially inner face is located in a rub track of the radially inner face.

A blade outer air seal (BOAS) assembly according to an exemplary aspect of the present disclosure includes, among other things, a BOAS segment including a radial inner face that circumferentially extends between a first mate face and a second mate face and axially extends between a leading edge face and a trailing edge face, the BOAS segment including a plurality of expansion slots that each open to both the first mate face and the radially inner face.

In a further non-limiting embodiment of the foregoing BOAS assembly, the expansion slots are filled with a thermal barrier coating.

In a further non-limiting embodiment of either of the foregoing BOAS assemblies, the plurality of expansion slots are at intersection between the first mate face and the radially inner face.

In a further non-limiting embodiment of any of the foregoing BOAS assemblies, the plurality of expansion slots are a first plurality of expansion slots and the BOAS segment further includes a second plurality of expansion slots that are each open to both the second mate face and the radially inner face.

In a further non-limiting embodiment of any of the foregoing BOAS assemblies, a bleed air conduit extends to an opening in the first mate face.

A method of providing a gas turbine engine component that resists wear according to an exemplary aspect of the present disclosure includes, among other things, providing a gas turbine engine component having a plurality of expansion slots at an intersection between a first outer face and a second outer face that is transverse to the first face.

In a further non-limiting embodiment of the foregoing method of providing a gas turbine engine component that resists wear, the first outer face comprises a mate face and the second outer face comprises a radially inner face of a Blade Outer Air Seal.

In a further non-limiting embodiment of either of the foregoing methods of providing a gas turbine engine component that resists wear, the plurality of expansion slots are filled with a thermal barrier coating.

Although the different examples have the specific components shown in the illustrations, embodiments of this disclosure are not limited to those particular combinations. It is possible to use some of the components or features from one of the examples in combination with features or components from another one of the examples.

DETAILED DESCRIPTION

Figure 1:
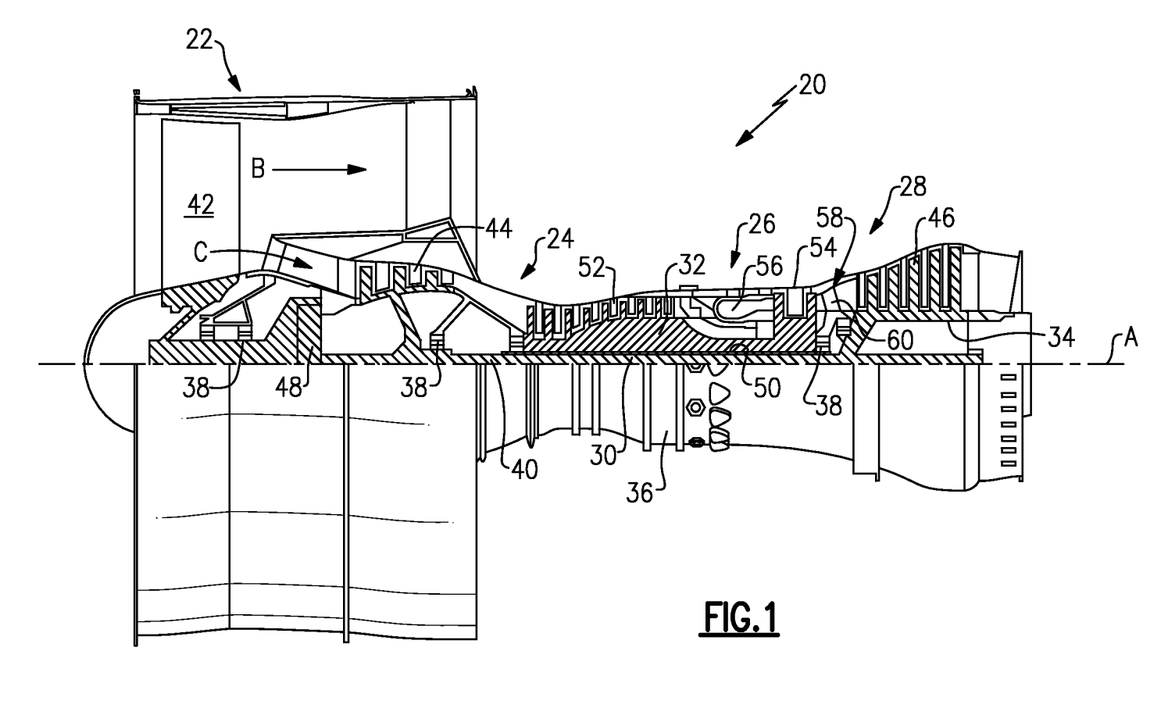
FIG. 1 illustrates a schematic, cross-sectional view of a gas turbine engine.

FIG. 1 schematically illustrates an example gas turbine engine 20 that includes a fan section 22, a compressor section 24, a combustor section 26, and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/(518.7° R)] ^0.5. The "Low corrected fan tip speed," as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Figure 2:
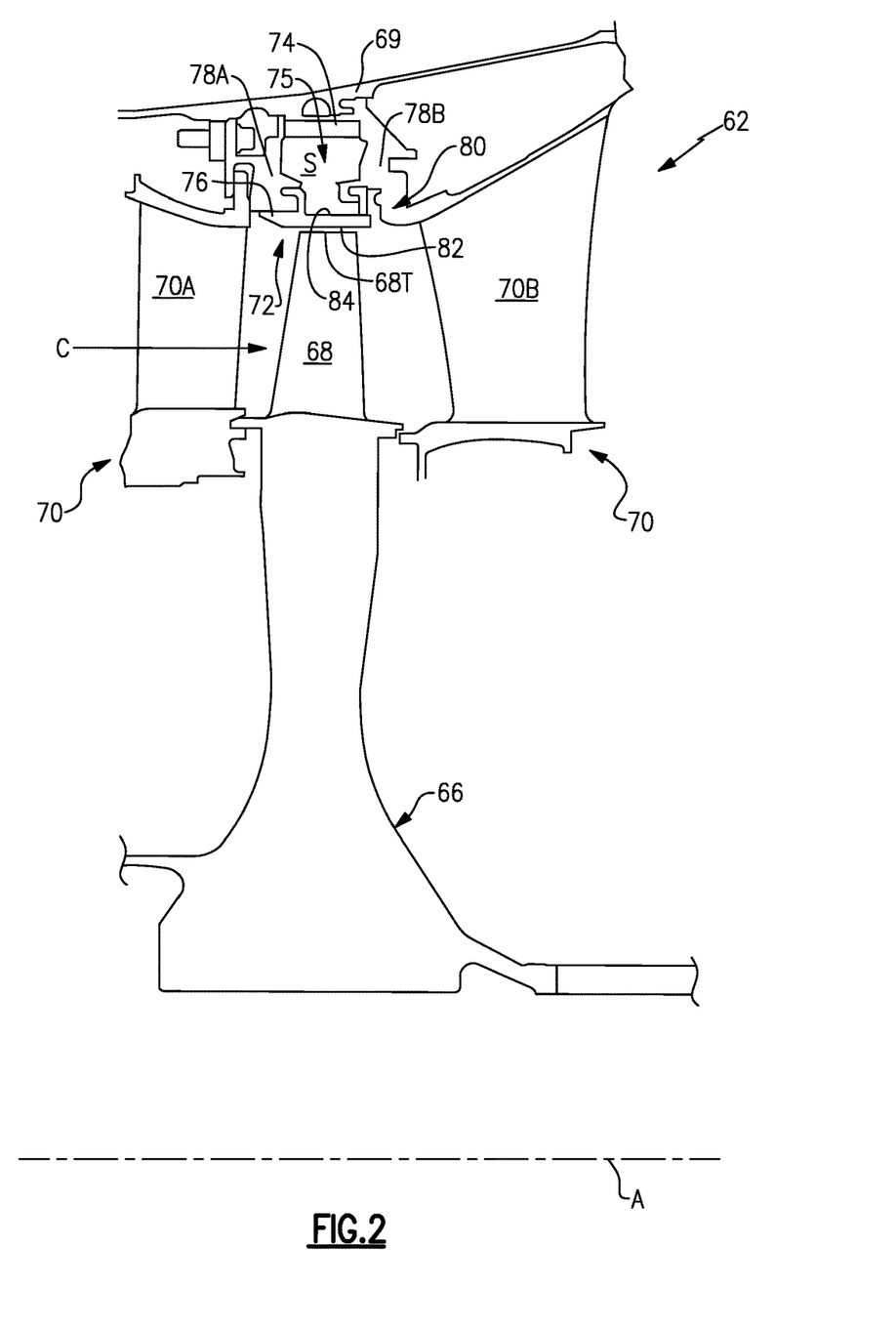
FIG. 2 illustrates a cross-section of a portion of a gas turbine engine.

FIG. 2 illustrates a portion 62 of a gas turbine engine, such as the gas turbine engine 20 of FIG. 1. In this exemplary embodiment, the portion 62 represents the high pressure turbine 54. However, it should be understood that other portions of the gas turbine engine 20 could benefit from the teachings of this disclosure, including but not limited to, the compressor section 24 and the low pressure turbine 46.

In this exemplary embodiment, a rotor disk 66 (only one shown, although multiple disks could be axially disposed within the portion 62) is mounted to the outer shaft 50 and rotates as a unit with respect to the engine static structure 36. The portion 62 includes alternating rows of rotating blades 68 (mounted to the rotor disk 66) and vanes 70A and 70B of vane assemblies 70 that are also supported within an outer casing 69 of the engine static structure 36.

Each blade 68 of the rotor disk 66 includes a blade tip 68T that is positioned at a radially outermost portion of the blades 68. The blade tip 68T extends toward a blade outer air seal (BOAS) assembly 72. The BOAS assembly 72 may find beneficial use in many industries including aerospace, industrial, electricity generation, naval propulsion, pumps for gas and oil transmission, aircraft propulsion, vehicle engines and stationery power plants.

The BOAS assembly 72 is disposed in an annulus radially between the outer casing 69 and the blade tip 68T. The BOAS assembly 72 generally includes a support structure 74 and a multitude of BOAS segments 76 (only one shown in FIG. 2). The BOAS segments 76 may form a full ring hoop assembly that encircles associated blades 68 of a stage of the portion 62. The support structure 74 is mounted radially inward from the outer casing 69 and includes forward and aft flanges 78A, 78B that mountably receive the BOAS segments 76. The forward flange 78A and the aft flange 78B may be manufactured of a metallic alloy material and may be circumferentially segmented for the receipt of the BOAS segments 76.

The support structure 74 may establish a cavity 75 that extends axially between the forward flange 78A and the aft flange 78B and radially between the outer casing 69 and the BOAS segment 76. A secondary cooling airflow S may be communicated into the cavity 75 to provide a dedicated source of cooling airflow for cooling the BOAS segments 76. The secondary cooling airflow S can be sourced from the high pressure compressor 52 or any other upstream portion of the gas turbine engine 20.

Figure 3:
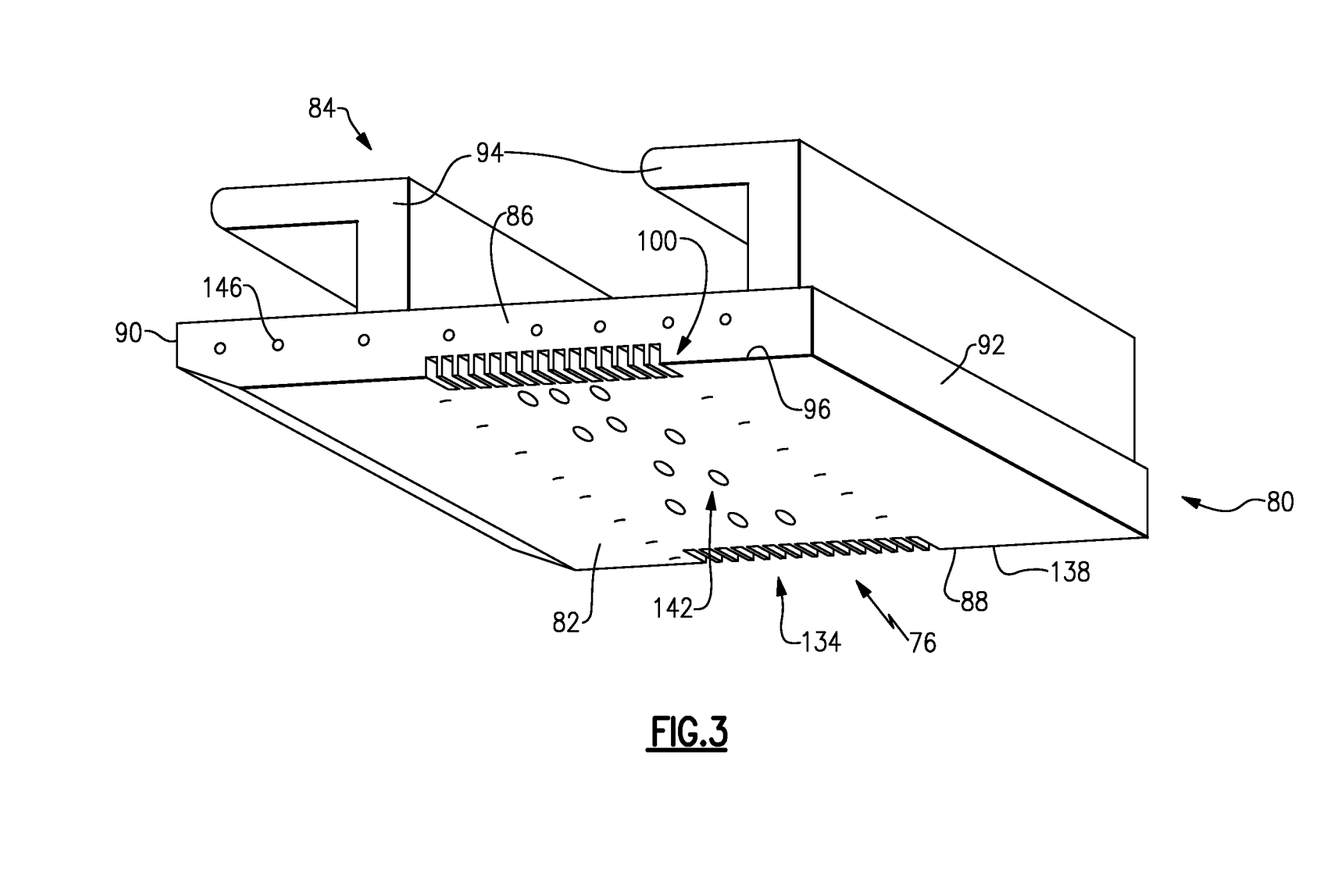
FIG. 3 illustrates a perspective view of a blade outer air seal (BOAS) segment.
Figure 4:
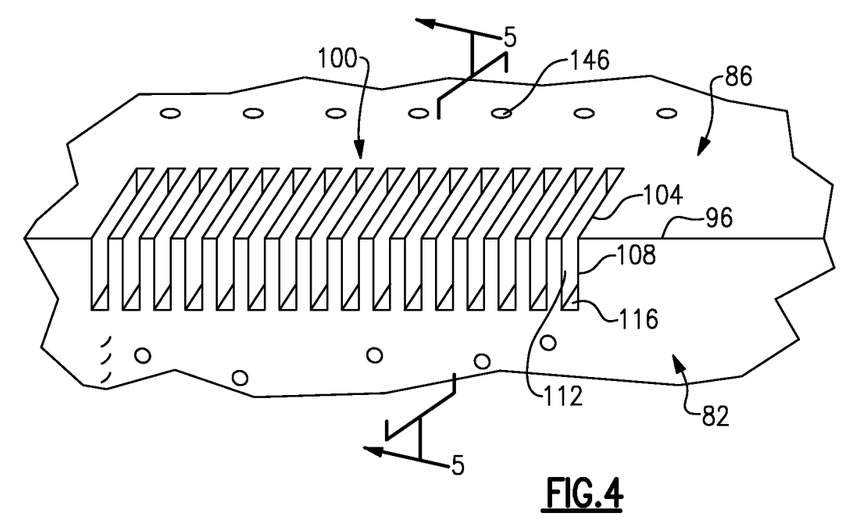
FIG. 4 illustrates a close-up view of a portion of the BOAS of FIG. 3.
Figure 5:
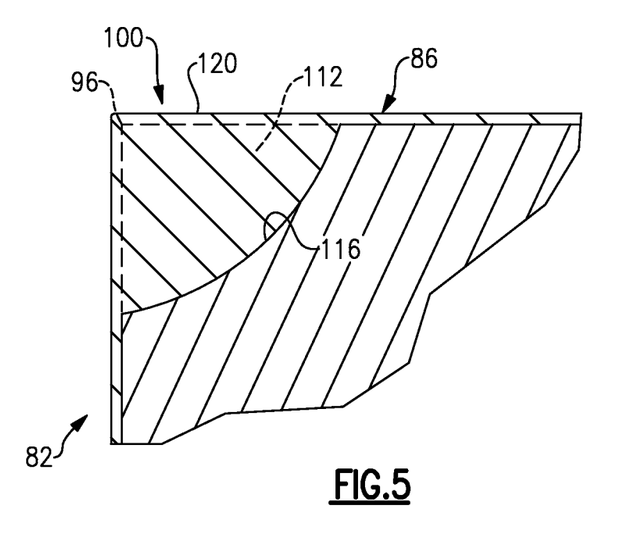
FIG. 5 illustrates a section view at line 6-6 in FIG. 5.

FIGS. 3 to 5 illustrate one exemplary embodiment of a BOAS segment 76 that may be incorporated into a gas turbine engine, such as the gas turbine engine 20. The BOAS segment 76 is an example type of gas turbine engine component. Portions of the BOAS segment 76 includes areas that are exposed to high temperature and other relatively harsh conditions.

Other types of gas turbine engine components face similar harsh conditions. Such components may include vane and blade platforms, burner liner segments, fuel nozzle guides, bulkhead segments, combustors, etc. Although the examples of this disclosure are described with reference to the BOAS segment 76, the other types of gas turbine engine components could also benefit from the teachings of this disclosure, particularly those components having thermal barrier coatings.

The BOAS segment 76 may include a seal body 80 having a radially inner face 82 (or faces) that faces toward the blade tip 68T a radially outer face 84 (or faces) that faces toward the cavity 75 (See FIG. 2). The radially inner face 82 and the radially outer face 84 circumferentially extend between a first mate face 86 and a second mate face 88 and axially extend between a leading edge face 90 and a trailing edge face 92.

The first mate face 86 meets the radially inner face 82 at an intersection 96. In some examples, the first mate face 86 is considered a first outer face and the radially inner face 82 is considered a second outer face. The first and second outer faces meet at the intersection 96.

During operation, the blade tip 68T interfaces with the intersection 96 prior to any other portion of the BOAS segment 76. As known, spallation often initiates at or near the intersection 96. The radially inner face 82 may be coated with a thermal barrier coating 120. Spallation can degrade the coating and the underlying seal body 80.

The example BOAS segment 76 includes a plurality of apertures 100 near the intersection 96. The apertures 100 help resist spallation by, for example, permitting relative thermal expansion of the seal body 80 in this area of the BOAS segment 76.

The BOAS segment 76 includes other intersections 96 having nearby apertures 100, such as intersections associated with the leading edge face 90 and trailing edge face 92. Other types of gas turbine engine components include other types of bodies having first and second outer faces that meet at intersections.

Each of the example apertures 100 extends from an opening 104 in the first mate face to an opening 108 in the radially inner face 82. The apertures 100 are defined generally by a pair of opposing walls 112 and a floor 116. The opening 104 intersects with the opening 108 at the intersection 96. In this example, no portion of the seal body 80 spans the opposing walls 112 within the aperture 100.

The apertures 100 are slots in this example. Other example apertures may include divots or notches. The apertures 100 may be considered expansion slots due to their purpose of providing expansion at and near the intersection 96. The example plurality of apertures 100 includes more than six, or even ten, apertures.

During the coating process, the apertures 100 are filled at least partially with the coating 120. In some examples, the apertures 100 are completely filled with the coating 120.

In this example, the coating 120 is an Yttria-Stabilized Zirconia. The thermal barrier coating 120 could include other elements in other examples. The seal body 80 is typically a cobalt or nickel alloy.

In this example, a second plurality of apertures 134 is positioned at an intersection 138 between the second mate face 88 and the radially inner face 82. Axially, both the plurality of apertures 100 and the plurality of apertures 134 are positioned within a rub track area 142 of the radially inner face 82. The rub track 142 is the region of the radially inner face 82 directly interfacing with the blade tip 68T during operation.

The first mate face 86 includes bleed air openings 146. Bleed air conduits deliver bleed air through the bleed air openings 146 to cool the interfaces between adjacent matefaces within the BOAS segment 76. The bleed air conduits and the bleed air openings 146 are separate and distinct from the apertures 100 and the apertures 134. The bleed air conduits are not completely filled with coating 120 as the bleed air conduits are configured to deliver bleed air.

In this example, the openings 104 extend radially from the intersection 96 to a position that is approximately halfway between the intersection 96 and the bleed air openings 146. The openings 108 extend circumferentially from the intersection 96 approximately 5 millimeters.

The floor 116 of the example apertures 100 is rounded and extends smoothly from the opening 104 to the opening 108. Rounding the floor 116 in this way may facilitate manufacturing of the apertures 100. The apertures 100 may be sized to fit within a blend allowance of repair operations to facilitate removal of the apertures 100 during a repair and subsequent refurbishing of new apertures.

Figure 6:
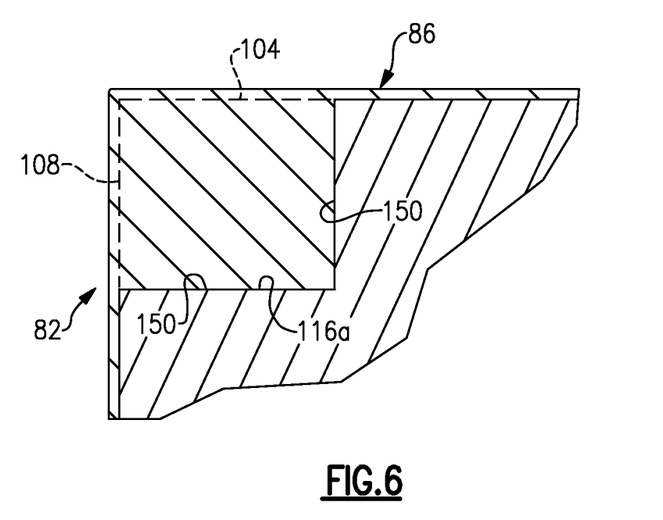
FIG. 6 shows a section view at the same position in another example BOAS.

Referring to FIG. 6, another example floor 116A may include two or more separate and distinct planar portions 150 extending from the opening 104 to the opening 108.

Figure 7:
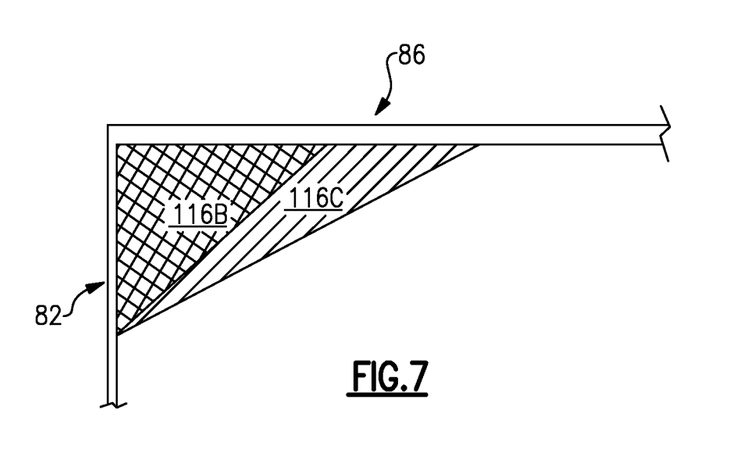
FIG. 7 shows a section view at the same position in yet another example BOAS.

Referring to FIG. 7, another example floor may include two floor portions 116B and 116C that are axially spaced from each other.

Features of the disclosed examples include introducing localized surface discontinuities to improve performance of a BOAS, or other type of component, to inhibit spallation and coating removal.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

Although embodiments of this invention have been disclosed, a worker of ordinary skill in the art would recognize that certain modifications would come within the scope of this invention. For that reason, the following claims should be studied to determine the true scope and content of this invention.

We claim:

1. A gas turbine engine assembly, comprising:
a seal body having a first outer face meeting a second outer face at an intersection, the seal body having a plurality of apertures each opening out to the first outer face and further opening out to the second outer face, wherein the seal body is a seal body of a blade outer air seal segment, wherein the first outer face is a first mate face of the seal body, and the second outer face is a radially inner face of the seal body, the radially inner face having a length that extends circumferentially between the first mate face and a second mate face, the radially inner face extending axially between a leading edge face and a trailing edge face,
wherein each aperture of the plurality of apertures extends along the radially inner face for only a portion of the length of the radially inner face between the first mate face and the second mate face,
wherein the radially inner face of the seal body is a radially inner face with reference to an orientation of the seal body when installed within a gas turbine engine and a central axis of the gas turbine engine,
wherein the radially inner face is extending circumferentially between the first mate face and the second mate face with reference to the central axis of the gas turbine engine when the seal body is installed within the gas turbine engine,
wherein the radially inner face is extending axially between the leading edge face and the trailing edge face with reference to the central axis of the gas turbine engine when the seal body is installed within the gas turbine engine; and
a coating filling at least a portion of the plurality of apertures.

2. The gas turbine engine assembly of claim 1, wherein the plurality of apertures extend across the intersection.

3. The gas turbine engine assembly of claim 1, wherein the plurality of apertures comprises more than six apertures.

4. The gas turbine engine assembly of claim 1, wherein at least one aperture of the plurality of apertures is completely filled with the coating.

5. The gas turbine engine assembly of claim 1, wherein at least one aperture of the plurality of apertures is defined by a pair of opposing walls and a curved floor.

6. The gas turbine engine assembly of claim 1 wherein at least one aperture of the plurality of apertures is defined by a pair of opposing walls and at least two planar floors.

7. The gas turbine engine assembly of claim 1, wherein the coating comprises Yttria-Stabilized Zirconia.

8. The gas turbine engine assembly of claim 1, further comprising a bleed air conduit that opens out to the first mate face.

9. The gas turbine engine assembly of claim 1, further comprising a blade, wherein the first mate face is a leading mate face relative to the second mate face in a direction that the blade is configured to travel relative to the seal body.

10. The gas turbine engine assembly of claim 1, wherein where the plurality of apertures open out to the first mate face intersects with where the plurality of apertures open out to the radially inner face.

11. The gas turbine engine assembly of claim 1, wherein the plurality of apertures open out to the radially inner face in a rub track of the radially inner face.

12. The gas turbine engine assembly of claim 1, wherein the plurality of apertures is a first plurality of apertures, the seal body further having a second plurality of apertures that each open to both the second mate face and the radially inner face, wherein each aperture of the second plurality of apertures extends along the radially inner face for only a portion of the length of the radially inner face between the first mate face and the second mate face.

13. A blade outer air seal (BOAS) assembly, comprising:
at least one BOAS segment including:

a radially inner face, a first mate face, a second mate face, a leading edge face, and a trailing edge face, the radially inner face having a length that circumferentially extends between the first mate face and the second mate face and axially extends between the leading edge face and the trailing edge face, a first plurality of expansion slots defined in the at least one BOAS segment that each open to both the first mate face and the radially inner face, a second plurality of expansion slots defined in the at least one BOAS segment that are each open to both the second mate face and the radially inner face, wherein each slot of both the first plurality of expansion slots and the second plurality of expansion slots extends along the radially inner face for only a portion of the length of the radially inner face between the first mate face and the second mate face.

14. The BOAS assembly of claim 13, wherein each slot of both the first plurality of expansion slots and the second plurality of expansion slots is filled with a thermal barrier coating.

15. The BOAS assembly of claim 13, wherein the first plurality of expansion slots are at an intersection between the first mate face and the radially inner face.

16. The BOAS assembly of claim 13, including a bleed air conduit that extends to an opening in the first mate face.

17. The BOAS assembly of claim 13,
wherein the radially inner face is a radially inner face with reference to an orientation of the BOAS segment when installed within a gas turbine engine,
wherein the radially inner face is extending circumferentially between the first mate face and the second mate face with reference to a central axis of the gas turbine engine when the BOAS segment is installed within the gas turbine engine,
wherein the radially inner face is extending axially between the leading edge face and the trailing edge face with reference to the central axis of the gas turbine engine when the BOAS segment is installed within the gas turbine engine.

18. A method of providing a Blade Outer Air Seal that resists wear, comprising:
providing a Blade Outer Air Seal having a plurality of expansion slots at an intersection between a first outer face and a second outer face that is transverse to the first outer face, wherein the first outer face is a first mate face and the second outer face is a radially inner face of the Blade Outer Air Seal,
wherein the radially inner face has a length that circumferentially extends from the first mate face to a second mate face of the Blade Outer Air Seal with reference to a central axis of gas turbine engine when the Blade Outer Air Seal is installed within the gas turbine engine,
wherein the plurality of expansion slots is a first plurality of expansion slots the Blade Outer Air Seal further includes a second plurality of expansion slots that each open to both the second mate face and the radially inner face, wherein each expansion slot of the first plurality of expansion slots and second plurality of expansion slots extend along the radially inner face for only a portion of the length of the radially inner face between the first mate face and the second mate face.

19. The method of claim 18, wherein the plurality of expansion slots are filled with a thermal barrier coating.

* * * * *